United States Patent
Woszczyna et al.

[11] Patent Number: 5,399,812
[45] Date of Patent: Mar. 21, 1995

[54] HOUSING FOR SUPPORTING AND ROUTING CABLES

[75] Inventors: Dale M. Woszczyna, Metamora; Andrew Nicker, Roseville, both of Mich.

[73] Assignee: Chrysler Corporation, Highland Park, Mich.

[21] Appl. No.: 65,713

[22] Filed: May 24, 1993
(Under 37 CFR 1.47)

[51] Int. Cl.6 .............................. H02G 3/04
[52] U.S. Cl. ........................ 174/97; 174/95; 174/48; 174/99 R; 174/72 A; 138/115; 248/68.1
[58] Field of Search ............. 174/48, 95, 97, 99 R, 174/101, 72 A, 117 F; 123/143 C, 169 P, 169 PA; 138/115; 248/507, 68.1; D13/155

[56] References Cited

U.S. PATENT DOCUMENTS

| | | | |
|---|---|---|---|
| 1,697,783 | 1/1929 | Schwarze | 123/143 C |
| 2,488,096 | 11/1949 | Newman | 123/143 C |
| 3,104,658 | 9/1963 | Olsen | 123/143 C |
| 3,339,010 | 8/1967 | Brentrup | 174/72 A |
| 4,156,795 | 5/1979 | Lacan | 174/97 |
| 4,391,426 | 7/1983 | Göthberg | 174/97 X |
| 4,781,255 | 11/1988 | Lock et al. | 174/97 |
| 4,816,617 | 3/1989 | Valosen | 174/97 X |
| 4,864,082 | 9/1989 | Ono et al. | 174/97 |
| 4,951,716 | 8/1990 | Tsunoda et al. | 174/101 X |
| 5,274,194 | 12/1993 | Belcher | 174/97 X |

FOREIGN PATENT DOCUMENTS 0471423  2/1951  Canada .................. 248/68.1

Primary Examiner—Leo P. Picard
Assistant Examiner—Hyung S. Sough
Attorney, Agent, or Firm—Kenneth H. MacLean

[57] ABSTRACT

A housing for supporting a plurality of cables in which separate channels are formed in the housing and each channel is defined by a pair of side walls at least one of which is provided with flexible tab members having a detent device that cooperate with similar detent device formed on the opposing wall for retaining a cable within an associated channel.

7 Claims, 2 Drawing Sheets

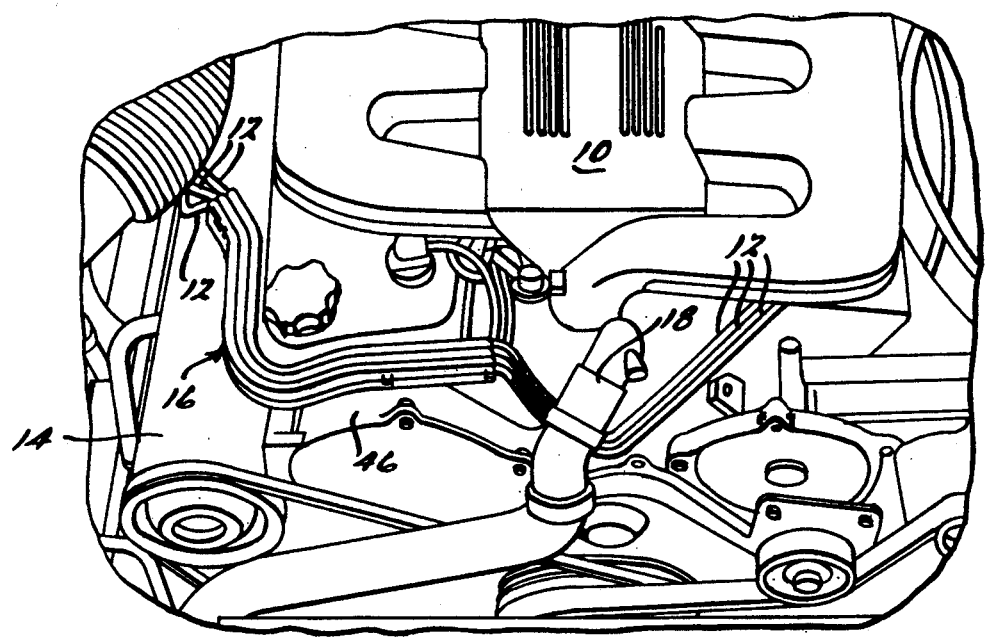
FIG. 1.
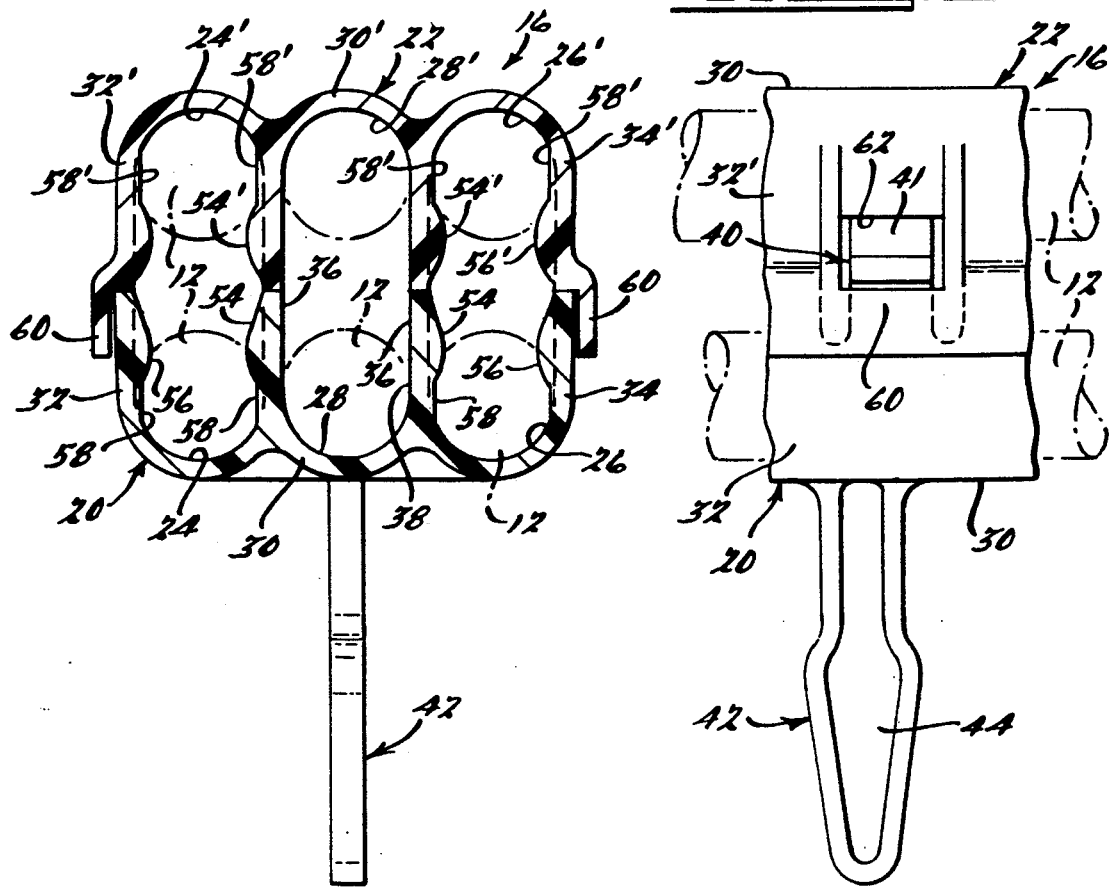
FIG. 3.
FIG. 5.

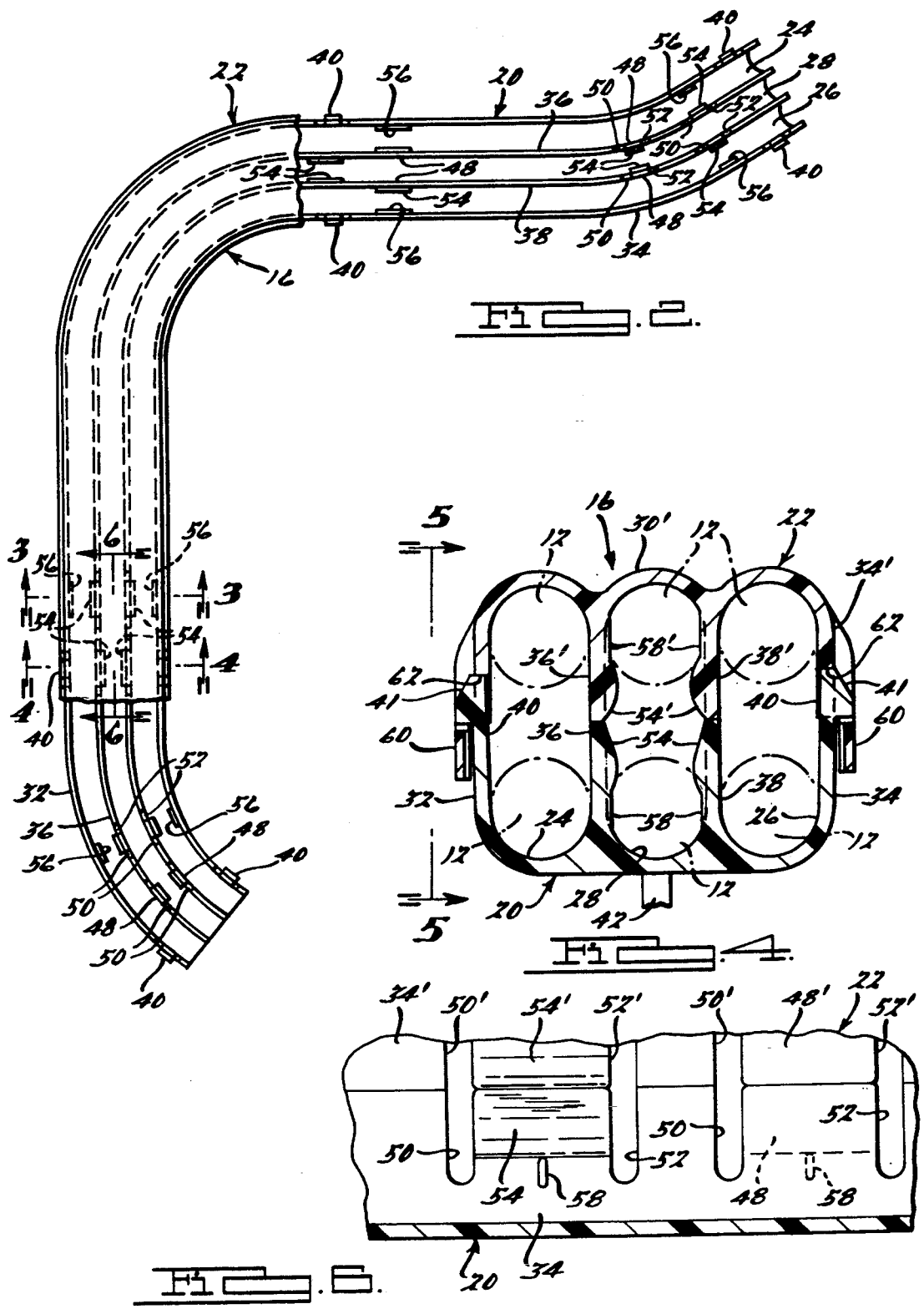

HOUSING FOR SUPPORTING AND ROUTING CABLES

BACKGROUND OF THE INVENTION

This invention relates to support housings and, more particularly, concerns a housing for supporting and routing a plurality of cables which may transmit electric current, light signals, or the like from one point to another of a vehicle.

In the past, various types of support devices have been proposed for grouping and holding a multiplicity of electrical or light signaling cables together as they extend from one area of a vehicle to another. For example, U.S. Pat. Nos. 2,488,096, to Newman issued Nov. 15, 1949, 3,104,658, to Olsen issued Sept. 24, 1963, and 3,339,010, to Brentrup issued Aug. 29, 1967, each discloses ignition harnesses in which the ignition cables are encapsulated within a solid plastic body and extend from a distributor for independent connection with the spark plugs of an automotive engine.

Another form of support device that has previously been proposed for use with ignition wires can be seen in U.S. Pat. No. 1,697,783, to Schwarze issued Jan. 1, 1929. In the Schwarze '783 patent the support device consists of two "T" shaped metallic half-shells welded together and including a pair of retaining clips for separating a high tension lead cable from the spark plug cables. In addition, the U.S. Pat. No. 4,781,255 to Lock et al, issued Nov. 1, 1988 shows a cable conduit system which includes a conduit element having a plurality of channels formed therein and includes a retention member and a lock member adapted to be located within the channels at intervals along their lengths for holding the cables.

The problem with the cable support devices seen in the above-mentioned Newman, Olsen, and Brentrup patents is that the cables are embedded within the support structure and, therefore, it is not possible to replace a single cable if, for some reason, it is desirable to do so. The device illustrated in the Schwarze patent, although not having the cables integrally formed with the support structure in the manner seen in Newman, Olsen, and Brentrup patents, would not be satisfactory in that the cables are bunched together in physical contact with each other which could result in the creation of an induced voltage between the cables with consequent misfiring of the spark plugs. In addition, the cable arrangement in Schwarze fails to provide an orderly appearance which has been found to be an important consideration to present purchasers of vehicles. As to the conduit system disclosed in the Lock et al patent, even though this conduit system may not suffer from the difficulties referred to with respect to the above-mentioned patented devices, the fact that a separate retainer and lock means is required in order to hold the cables in place causes the system to be expensive to manufacture and assemble.

SUMMARY OF THE INVENTION

Accordingly, the objects of the present invention are to provide a new and improved cable supporting housing that is molded from a plastic material and has channels formed therein for receiving and physically separating cables from each other so as to prevent induced voltage therebetween, and for retaining the cables within the channels by means of cooperating detent means which are spaced along the length of a channel and formed on opposed side walls of each of the channels; to provide a new and improved housing for supporting a plurality of cables in which separate channels are formed in the housing and each channel is defined by a pair of side walls at least one of which is provided with flexible tab members having detent means that cooperate with similar detent means formed on the opposing wall for holding a cable within an associated channel; to provide a new and improved housing for supporting a plurality of cables that is formed with laterally spaced channels the side walls of each of which are formed with integral and opposed semi-cylindrical detent means at spaced intervals along the length of the channel for retaining a cable therebetween; and to provide a new and improved housing for routing, protecting, and supporting a plurality of cables that is adapted to be releasably fastened to a support panel and that consists of an upper member and a lower member with each of the latter mentioned members being provided with a plurality of cable retaining channels arranged in side-by-side relationship and also provided with means which permit the two sections of the housing to be snap-fitted together so that the centers of the cables of one of the aforementioned members are located in a first plane and the centers of the cables in the other of the two members are located in a second plane parallel to the first plane.

The above objects and others are realized in accordance with the present invention by a support housing which, in the preferred form, is molded from a plastic material and includes an upper member and a lower member, each of which is provided with a plurality of channels that are uniform in configuration when viewed in cross-section and that serve to receive and retain a plurality of cables. The upper and lower members of the housing are provided with cooperating latch means which allow the two members to be snap-fitted together so as to form a compact unitary housing which can be fastened to a support panel by push-in type studs formed with the base of the lower member and accommodated by suitable receiving openings formed in the support panel. When used for retaining six cables, each of the members of the housing is formed with two outer channels and one inner channel for supporting and positioning the cables in side-by-side relationship. The inner channel is defined by a pair of laterally spaced inner walls integrally formed with the housing and each of the outer channels is defined by an outer wall and one of the pair of inner walls. The outer wall has an outer surface and an inner surface and each of the inner walls is slotted or slit at predetermined points along the length thereof so as to provide a group of relatively flexible tab members spaced at intervals along the length of the channels and located in pairs along an axis extending transversely to the longitudinal axis of the channels. In addition, certain pairs of the transversely aligned tab members, which have the inner surfaces thereof facing the inner channel, are formed with cooperating first detent means for allowing a portion of a cable to be pressed into the inner channel and retained in position by the first detent means. Others of the pairs of the tab members each have the surface thereof facing the outer channel and also the inner surface of the outer wall formed with cooperating second detent means for retaining a cable within the outer channel. The arrangement is such that, after the cables are placed into each of the two members of the housing for retention by the first and second detent means located in the inner and outer channels, the two members are snap-fitted together so that the cables located in the upper member are vertically aligned with the cables located in the lower member.

Other objects, features, and advantages of the present invention will be apparent from the following detailed description when taken with the drawings.

BRIEF DESCRIPTION OF THE DRAWINGS

FIG. 1 is an overhead view of a portion of an automotive engine provided with a support housing according to the invention for supporting, protecting and guiding the spark plug cables associated with the engine;

FIG. 2 is an enlarged plan view of the support housing seen in FIG. 1 separated from the engine and with parts broken away and also the cables removed therefrom so as to more clearly show the details of construction of the support housing;

FIG. 3 is a further enlarged sectional view of the support housing taken on line 3—3 of FIG. 2;

FIG. 4 is a sectional view taken on line 4—4 of FIG. 2;

FIG. 5 is a side elevational view taken on line 5—5 of FIG. 4; and

FIG. 6 is an enlarged sectional view taken on line 6—6 of FIG. 2.

DETAILED DESCRIPTION OF THE PREFERRED EMBODIMENT

Referring now to the drawings and more particularly FIG. 1 thereof, a part of a V-type internal combustion engine 10 for a vehicle is shown provided with a conventional electronic ignition system which includes the usual ignition coil (not shown) that is connected with one end of a plurality of ignition cables each of which is identified by the reference numeral 12. As is usually the case, the ignition cables 12 extend from the ignition coil to the spark plugs (not shown) of the engine 10. In this instance, the engine 10 shown has six cylinders and, therefore, six ignition cables 12 of different length are provided for connection with the six spark plugs, three of which are located on one side and the other three on the other side of the engine 10.

For purposes of protecting and guiding the ignition cables 12 as they extend over an air conditioning compressor 14 and other parts of the engine 10, a support housing 16, made in accordance with the present invention, is provided which serves to rout the cables 12 in an orderly fashion from a point adjacent the ignition coil to a point near a radiator hose 18. The support housing 16 according to the present invention is shown in detail in FIGS. 2-6 and it will be noted that, for purposes of clarity, the cables 12 are removed entirely from the support housing 16 as seen in FIGS. 2, 5, and 6 and are shown in phantom lines in FIGS. 3 and 4.

As seen in FIGS. 2-5, the support housing 16 consists of a lower member 20 and an upper member 22 each of which is a molded member made from a heat resistant plastic material. Each of the members 20 and 22 includes straight sections integrally connected to curved sections thereby permitting the cables 12 to follow a circuitous path from the ignition coil towards the frontal portion of the engine 10.

More specifically, and as best seen in FIGS. 2 and 4, the lower member 20 is formed with a pair of identical U-shaped outer channels 24 and 26 and an identical U-shaped inner channel 28, all of which are of uniform cross-section and extend the length of the member 20. The outer and inner channels 24-28 are located in side-by-side relationship and are defined by a base portion 30 formed with a pair of outer walls 32 and 34 and a pair of inner walls 36 and 38. The outer and inner walls 32-38 are integrally formed with the base portion 30 and, as seen in FIG. 4, each wall 32-38 is located in a plane which is normal to the plane of the base portion 30. At spaced intervals along the length of each of the outer walls 32 and 34, a barb-shaped member 40 is integrally formed with the associated outer wall and has a tapered head 41 that serves as the bolt portion of a latch means to be described more fully hereinafter. In addition, at spaced intervals along the length of the base portion 30, a stud 42 is integrally formed with and projects downwardly outwardly therefrom. Each stud 42 is formed with an opening 44 providing side walls for the stud 42 that are adapted to flex inwardly when the stud 42 is inserted into a circular opening (not shown) formed in a support panel 46 located adjacent the engine 10. Thus, the support housing 16 can be mounted within the engine compartment in a fixed position for supporting the cables 12.

Each of the inner walls 36 and 38 is provided with flexible tab members 48 at spaced intervals along the length of each of the walls 36, 38. As seen in FIG. 6, each tab member 48 is defined by a pair of opened-ended, identical U-shaped slots 50 and 52 formed in the associated wall along an axis which is perpendicular to the plane of the base portion 30 of the lower member 20. As seen in FIGS. 2, 3, 4 and 6, each of the tab members 48 has one surface thereof integrally formed with a semi-cylindrical detent 54 which faces and extends into either the inner channel 28 or one of the outer channels 24, 26. As seen in FIG. 2, the detent 54 is formed on alternate surfaces of the tab members 48 as they extend along the length of each inner wall 36, 38 and, in each instance, where the detent 54 faces and extends into an outer channel 24 or 26, a similarly shaped and sized detent 56 is integrally formed on the outer wall 32, 34 in transverse alignment with the detent 56. In addition, it will be noted that the tab members 48 located in the curved sections of the member 20 are narrower in width than those located in the straight sections. Also, below each of the detents 54, 56, a rib 58 is integrally formed with the associated wall and extends laterally outwardly therefrom into the same channel into which the associated detent extends. As seen in FIG. 6, each rib 58 is located along an axis which is normal to the plane of the base portion 30.

The upper member 22 of the support housing 16 is essentially a mirror image of the lower housing 20 and, accordingly, those parts of the upper member 22 which are identical to and correspond to the parts of the lower member 20 are identified by the same reference numerals but primed. In this regard, one difference between the upper member 22 and the lower member 20 of the support housing 16 is that each of the outer walls 32' and 34' of the upper member 22 is provided with a skirt portion 60 seen in FIGS. 3-5 that extends the full length of and is outwardly offset relative to the associated outer wall 32'. Another difference is that each of the outer walls 32' and 34' is formed with a number of rectangular openings 62 which correspond to the number of barb members 40 formed on the outer walls 32 and 34 of the lower member 20. Each of the openings 62 serves as a keeper constituting the other part of the aforementioned latch means to accommodate and receive the tapered head 41 of one of the barb members formed with the lower member 20 and thereby releasably join the upper and lower members 20 and 22 together. In this regard, it will be noted that each barb member 40 as well as the skirt portion 60 of the upper member 22 is capable of flexing laterally so when the upper member 22 is superimposed over the lower member 20 and as the two members 20 and 22 are brought together, the tapered head 41 of each barb member 40 snaps into registry with one of the openings 62 in the outer wall 32', 34' of the upper member 22.

Prior to connecting the upper member 22 to the lower member 20 as described above, three of the ignition cables 12 which are to be connected to the spark plugs of one bank of cylinders of the engine 10 are located within the channels 24-28 of the lower member 20 and the other three cables 12 for the other bank of cylinders are located within the channels 24'-28' of the upper member 22. As each cable 12 is placed within its accommodating channel of the member 20 for example, the cable 12 readily moves into all parts of the channel except where it engages opposed pairs of the detents 54—54 provided on the inner walls 36 and 38 or detents 54-56 provided on an inner wall and an outer wall. In those instances, the cable 12 is pressed towards the base of the receiving channel until it assumes the position seen in FIGS. 3 and 4. In this position the opposed detents 54—54 and 54-56 serve to retain the cable 12 and prevent it from moving vertically out of the channel. At the same time, the ribs 58 associated with each of the detents 54 and 56 are embedded within the elastomeric outer material of the cable 12 and, as a consequence, prevent the cable 12 from moving along its longitudinal axis relative to the upper and lower members 20 and 22.

Although the upper and lower members 20 and 22 of the support housing 16 are each shown as having three channels for receiving three cables 12, it should be apparent that each of the members 20, 22 could have as few as two channels or more than three channels if so desired. For example, for a four cylinder engine, it would be a simple matter to eliminate one of the inner walls and substitute an outer wall therefor. If the invention should be used with an eight, ten, or twelve cylinder engine, additional inner walls can be provided for accommodating the additional cables. Accordingly, it should be understood that various changes and modifications can be made in the present invention without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A housing for supporting, protecting and routing a plurality of cables from one area to another area of a vehicle, said housing including a pair of releasably interconnected members, each of said members being formed as a molded plastic member provided with a plurality of side-by-side channels, each of the channels being defined by a pair of laterally spaced walls integrally formed with the housing, at least one of said walls being provided with open-ended slots so as to form a plurality of flexible tab members at different locations along the length of said one of said walls, and cooperating detent means formed on said tab members and on a part of the wall opposite to and transversely aligned with each of said tab members for allowing a cable to be pressed therebetween into the base of each of said channels whereby portions of the cable that are spaced along the longitudinal axis of the cable are retained in a fixed position within the channel by said detent means.

2. The housing set forth in claim 1 wherein one of said pair of releasably interconnected members is provided with a flexible barb member at spaced intervals thereof and the other of said pair of releasably interconnected members is provided with an opening for receiving said barb member.

3. The housing set forth in claim 1 wherein each of said channels is provided with means located adjacent the detent means for preventing longitudinal movement of the cable relative to the housing.

4. The housing set forth in claim 1 wherein one of said pair of interconnected members is integrally formed with a plurality of stud members adapted to be received within accommodating openings in a support panel for maintaining the housing in a fixed position.

5. A housing for routing and protecting a plurality of spark plug ignition cables which extend from one area to another area of the engine compartment of a vehicle, said housing comprising a pair of members adapted to be releasably connected together, each of said members being formed as a molded plastic member and having two outer channels and at least one inner channel provided therein for supporting and positioning said cables in side-by-side relationship, a base portion, said inner channel being defined by a pair of laterally spaced inner walls integrally formed with the said base portion, each of said outer channels being defined by an outer wall integrally formed with the base portion and one of said pair of inner walls, said outer wall having an outer surface and an inner surface, each of said inner walls being provided with a plurality of relatively flexible tab members spaced along the length of the housing and located in pairs along an axis extending transversely to the longitudinal axis of the inner channel, each of said flexible tab members having an inner surface facing the inner channel and an outer surface facing an outer channel, certain pairs of transversely aligned tab members each having the inner surface thereof formed with first detent means for allowing a portion of a cable to be pressed into the inner channel and retained in position by said first detent means, the other of said pairs of tab members each having the outer surface thereof formed with second detent means, the inner surface of each of said outer walls located opposite to said second detent means being formed with third detent means which cooperate with said second detent means for retaining a portion of a cable within the outer channel, and check means formed on the inner walls and the outer walls of each of said channels for preventing the cables from moving longitudinally relative to the housing.

6. The housing set forth in claim 5 wherein each of said check means takes the form of a rib located along an axis normal to the base portion.

7. The housing set forth in claim 5 wherein means are formed on one of said members for connecting the housing to a support panel located in the engine compartment.

* * * * *